H. B. BYRON.
FILM SPROCKET WHEEL FOR MOVING PICTURE MACHINES.
APPLICATION FILED MAY 28, 1921.

1,424,877.

Patented Aug. 8, 1922.

WITNESSES

INVENTOR
HAGAR B. BYRON
BY
ATTORNEYS

H. B. BYRON.
FILM SPROCKET WHEEL FOR MOVING PICTURE MACHINES.
APPLICATION FILED MAY 28, 1921.
1,424,877.
Patented Aug. 8, 1922.
2 SHEETS—SHEET 2.
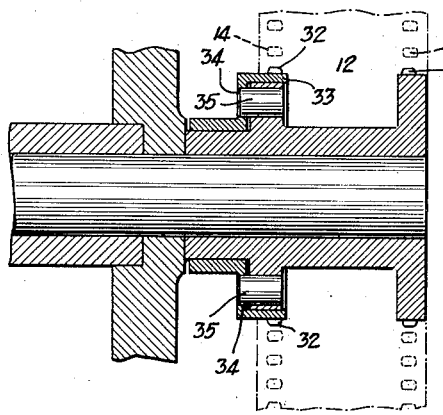
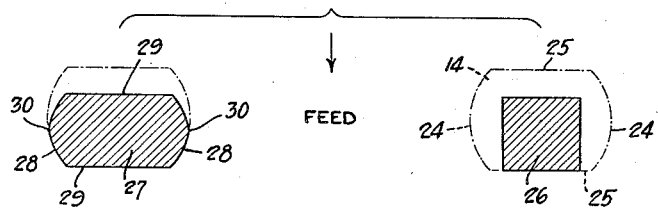
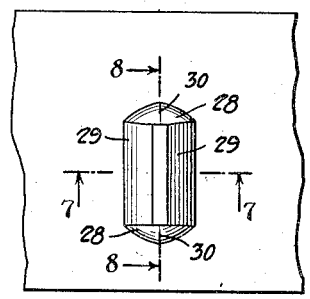
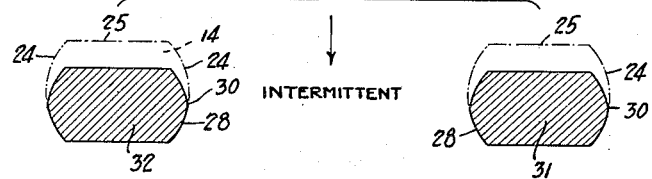
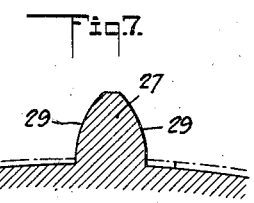
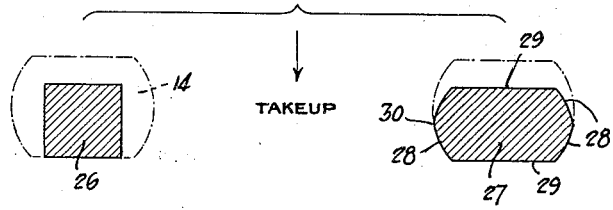
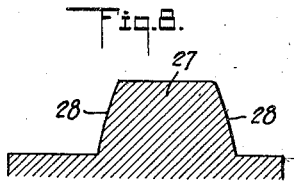
WITNESSES
Frederick Diehl.
Hugh H Ott
INVENTOR
HAGAR B. BYRON
BY
ATTORNEYS

UNITED STATES PATENT OFFICE.

HAGAR B. BYRON, OF NEW YORK, N. Y.

FILM SPROCKET WHEEL FOR MOVING-PICTURE MACHINES.

1,424,877.  Specification of Letters Patent.  Patented Aug. 8, 1922.

Application filed May 28, 1921. Serial No. 473,541.

*To all whom it may concern:*

Be it known that I, HAGAR B. BYRON, a citizen of the United States, and a resident of the city of New York, borough of Manhattan, in the county and State of New York, have invented a new and Improved Film Sprocket Wheel for Moving-Picture Machines, of which the following is a full, clear, and exact description.

This invention relates to improvements in a moving picture machine mechanism for the taking, printing or projecting of moving pictures and refers particularly to the construction and arrangement of the sprocket wheels for handling the films.

The present invention contemplates the provision or improvement in the means for handling the film to more effectively cope with the problem of register, and to prevent injury to film by the "backing up" or crowding of the same upon the back of the teeth in event of the meshing of too many teeth at one time, a common existing fault which causes unending trouble and precludes the keeping of the picture steady on the screen.

Another problem presented is to overcome the shrinkage in the film which varies the lineal pitch and width of the same, and the invention therefore contemplates a tooth construction and arrangement which effectively compensates therefor.

A further object of the invention resides in the provision of a sprocket wheel construction and arrangement which does not materially increase the cost of production of the machine, and which is thoroughly reliable and highly efficient in its purpose.

With the above recited and other objects in view, the invention resides in the novel construction, combination and arrangement of elements set forth in the following specification, pointed out in the appended claims and illustrated in the accompanying drawings, in which—

Fig. 2 is an enlarged fragmentary detail sectional view through the intermittent sprocket indicated by the section line 2—2 of Fig. 1.

Figs. 3, 4 and 5 are collective sectional views of the feed, intermittent and take-up sprockets, said sections being taken approximately at the base of each tooth.

Fig. 6 is an enlarged plan view of one of the pilot teeth.

Fig. 7 is an enlarged sectional view therethrough indicated by the section line 7—7 of Fig. 6.

Fig. 8 is an enlarged transverse sectional view indicated by the section line 8—8 of Fig. 6.

Figure 1:
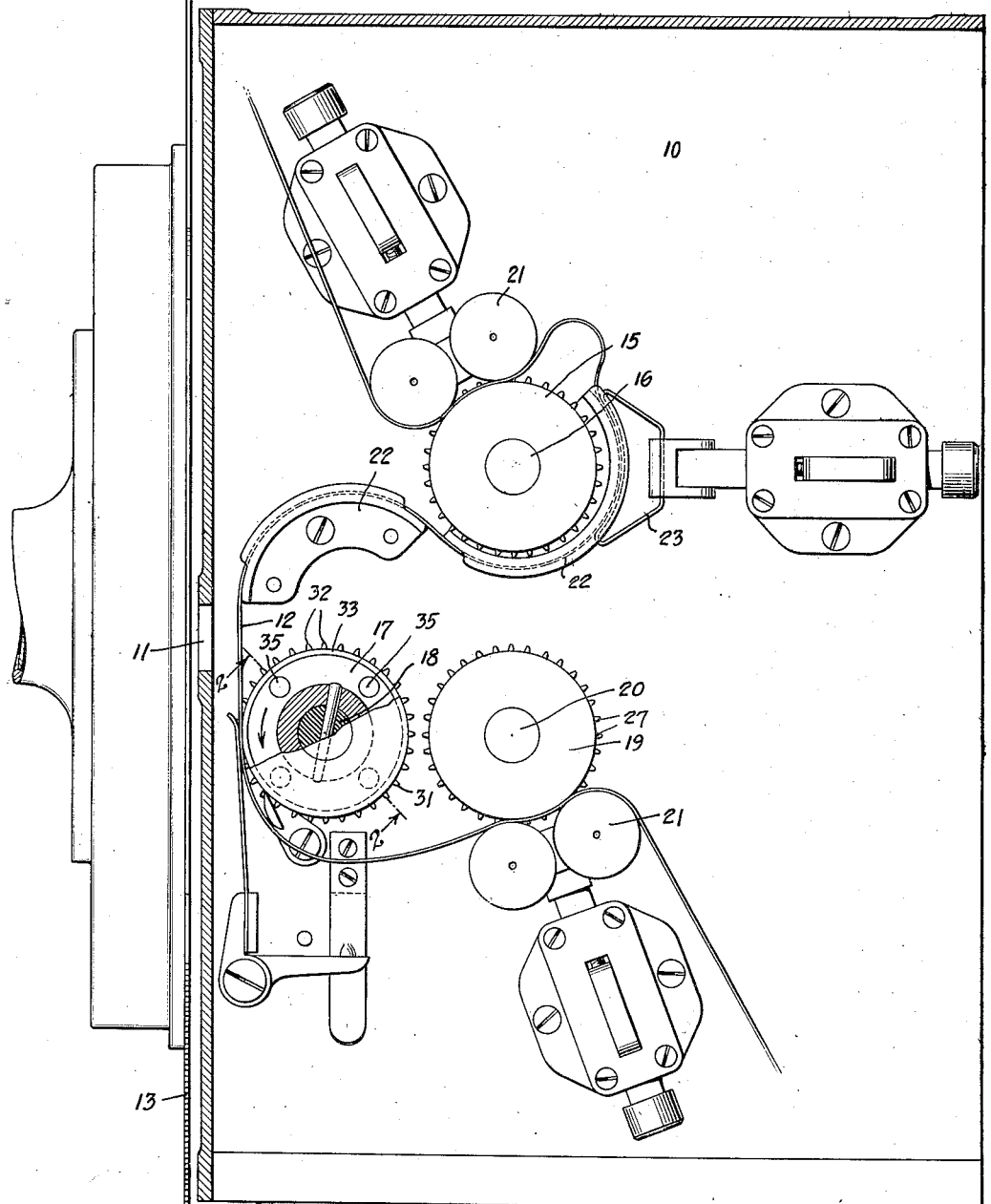
Figure 1 is a fragmentary side elevation of a moving picture projecting machine illustrating the general arrangement of the film sprockets and associated elements, parts being broken away to disclose the underlying structure.

By referring to the drawings, similar characters of reference indicate like parts throughout the several views thereof. The projecting machine 10 is provided with the usual aperture 11 through which the light is projected to the film 12, and which light is interrupted by a shutter 13. The film 12 is constructed in the usual manner with the perforations 14 in its opposite marginal edges. The machine is provided with a feed sprocket 15 mounted and secured on the feed sprocket shaft 16, an intermittent sprocket 17 mounted and secured on the intermittent sprocket shaft 18, and a take-up sprocket 19 mounted and secured on the take-up sprocket shaft 20. Film guide rollers 21 co-operate with the feed and take-up sprockets 15 and 19 and a suitable tension means including the guideways 22 and tension shoe 23 are provided and interposed between the feed and intermittent sprockets.

The perforations 14 of the film are of common construction as heretofore stated, the same being provided with concentric arcuate side walls 24 and straight intersecting parallel end walls 25. The feed and take-up sprockets are provided with one row or annular series of sprocket teeth 26 of common construction, the same being of square formation at their base and having involute front and rear driving faces. These teeth are appreciably less in width than the width of the perforations and less in length than the length of the perforations. The feed and take-up sprockets are further provided with a second annular series or row of pilot teeth 27 having bi-cone sides 28 and involute front and rear driving faces 29. The bi-conical side faces 28 are obtained by an arc, the radius of which corresponds substantially to the radius of the arc of the side walls of the perforations in the film. These arcs are arranged to intersect each other to provide an apex 30 at the longitudinal center of the side of each tooth. From this construction, in driving the film forward, the front involute driving face 19 and the front bi-conical face of each side engage and coact respectively with the front straight wall of the perforation and the forward portion of each of the arcuate side walls of the perforation. The intermittent sprocket wheel is provided with a stationary annular series or row of pilot teeth 31 of similar construction to the pilot teeth 27 of the feed and take-up sprockets. The intermittent sprocket is further provided with a second laterally adjustable or movable row or annular series of pilot teeth 32 of the same construction. The row or series 32 may be associated with the intermittent sprocket in any suitable manner to permit of its lateral adjustment or movement, the same being here illustrated as mounted on an annulus or flange 33 which is provided with apertures or openings 34 for the reception of the pins 35 constituting a connection between the annulus 33 and the sprocket to effect the turning movement of the same therewith and yet permit of lateral relative movement therebetween.

Preferably the feed and take-up sprockets are constructed to arrange the straight and pilot teeth 26 and 27 at the opposite sides thereof, that is with one row of pilot teeth on either side and one row of ordinary teeth on either side in order that uniform wear obtains on all of the perforations of the film. It is, of course, to be understood that if desired the feed and take-up sprockets may be constructed with a double row of pilot teeth if desired, the main reason for not using pilot teeth on both sides with the self-adjusting feature being that the cost of such an arrangement would increase the expense to such an extent as to render the same prohibitive. The reason for employing pilot teeth on both sides of the intermittent sprocket is because of the severity of the action or movement of the film. Only one row or annular series of pilot teeth on the intermittent sprocket, namely the stationary or fixed row of teeth accomplishes the registry of the picture, whereas the laterally adjustable or movable row 32 accomplishes and coacts with the stationary row to effect the driving of the film. The lateral mobility of the row or series 32 permits the film when shrunken to draw said row into alignment therewith to change the gage of the teeth. It will thus be seen that a sprocket wheel arrangement and tooth construction is provided which coacts with the common formation of the perforations in the film to obtain a more perfect registry of the same, which effects a more even wear on the perforations and which precludes cutting or biting of the teeth into the walls of the perforations in the film irrespective of whether said walls contact with the front or rear driving face thereof.

It is to be understood that the right is reserved to embodiments other than those actually illustrated herein, to the full extent indicated by the general meaning of the terms in which the claims are expressed, and by variations in the phraseology of the same.

Having thus described my invention, what I claim is:

1. A film sprocket wheel for moving picture machines provided with teeth having bi-cone side faces and involute front and rear driving faces.

2. A film sprocket wheel construction provided with two rows of sprocket teeth having bi-cone side faces and involute front and rear driving faces, one of said rows being stationary and the other laterally adjustable with respect thereto whereby to compensate for shrinkage in the width of the film.

3. In a moving picture machine mechanism, means for handling the film to intermittently present a single picture in registration with the aperture thereof, comprising feed and take-up sprockets provided with oppositely arranged rows of straight driving teeth and pilot teeth having bi-cone side and involute driving faces, and an intermittent sprocket provided with a double row of pilot teeth having bi-cone sides and involute driving faces.

4. In a moving picture machine mechanism, means for handling the film to intermittently present a single picture in registration with the aperture thereof, comprising feed and take-up sprockets provided with oppositely arranged rows of straight driving teeth and pilot teeth having bi-cone side and involute driving faces, and an intermittent sprocket provided with a double row of pilot teeth having bi-cone sides and involute driving faces, one of said rows being stationary or fixed and the other laterally adjustable with respect thereto whereby to compensate for the shrinkage in the width of the film.

5. In a moving picture machine mechanism, means for handling the film to intermittently present a single picture in registration with the apertures thereof, comprising feed and take-up sprockets provided with oppositely arranged rows of straight driving teeth and pilot teeth having bi-cone side and involute driving faces, and an intermittent sprocket provided with a stationary row of pilot teeth having bi-cone sides and involute driving faces, and a laterally movable flange provided with a row of pilot teeth having bi-cone sides and involute driving faces, said flange being movable by the engagement of the film perforations therewith to accommodate itself to the film to compensate for shrinkage in the width of the same.

HAGAR B. BYRON.